(12) United States Patent
Wang et al.

(10) Patent No.: US 10,152,594 B2
(45) Date of Patent: *Dec. 11, 2018

(54) METHOD AND DEVICE FOR IDENTIFYING VIRUS APK

(71) Applicant: BEIJING QIHOO TECHNOLOGY COMPANY LIMITED, Beijing (CN)

(72) Inventors: Xun Wang, Beijing (CN); Xu Zhang, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 14 days.

This patent is subject to a terminal disclaimer.

(21) Appl. No.: 15/440,901

(22) Filed: Feb. 23, 2017

(65) Prior Publication Data

US 2017/0161496 A1 Jun. 8, 2017

Related U.S. Application Data

(63) Continuation of application No. 14/386,681, filed as application No. PCT/CN2013/072474 on Mar. 12, 2013, now Pat. No. 9,619,650.

(30) Foreign Application Priority Data

Mar. 21, 2012 (CN) .......................... 2012 1 0076889

(51) Int. Cl.
*G06F 21/56* (2013.01)
*H04L 29/06* (2006.01)

(52) U.S. Cl.
CPC .......... *G06F 21/561* (2013.01); *G06F 21/563* (2013.01); *G06F 21/564* (2013.01);
(Continued)

(58) Field of Classification Search
CPC .... G06F 21/561; G06F 21/564; G06F 21/565; H04L 63/20
See application file for complete search history.

(56) References Cited

U.S. PATENT DOCUMENTS

| 8,590,039 B1 | 11/2013 | Muttik et al. |
| 8,806,641 B1 * | 8/2014 | Li .................. G06F 21/564 |
| | | 717/174 |

(Continued)

FOREIGN PATENT DOCUMENTS

| CN | 1567118 A | 1/2005 |
| CN | 1752888 A | 3/2006 |

(Continued)

OTHER PUBLICATIONS

Enck et al., A Study of Android Application Security, USENIX Security Symposium, Aug. 2011.

(Continued)

*Primary Examiner* — Hadi S Armouche
*Assistant Examiner* — Shu C Gao
(74) *Attorney, Agent, or Firm* — Baker & Hostetler LLP

(57) ABSTRACT

Disclosed are a method and a device for identifying a virus APK. The method comprises: presetting a virus database comprising virus characteristic codes; detecting that a designated file in a target Android installation package APK contains at least one of the virus characteristic codes; and determining that the target Android installation package APK is a virus APK. In the application, the virus APK and a variation thereof can be rapidly, accurately and effectively identified, thereby improving the security of an APK application.

15 Claims, 4 Drawing Sheets

(52) U.S. Cl.
CPC ............ *G06F 21/565* (2013.01); *H04L 63/20* (2013.01); *G06F 2221/033* (2013.01)

(56) References Cited

U.S. PATENT DOCUMENTS

| | | | |
|---|---|---|---|
| 8,826,439 B1* | 9/2014 | Hu | G06F 21/56 726/24 |
| 8,874,579 B2* | 10/2014 | Sinclair | H04L 63/1416 707/737 |
| 8,984,628 B2* | 3/2015 | Mahaffey | G06F 21/564 713/187 |
| 9,104,871 B2* | 8/2015 | Tuvell | G06F 21/56 |
| 9,235,704 B2* | 1/2016 | Wootton | G06F 21/564 |
| 9,367,680 B2* | 6/2016 | Mahaffey | G06F 21/564 |
| 9,781,151 B1* | 10/2017 | McCorkendale et al. | H04L 63/11441 |
| 2011/0145920 A1 | 6/2011 | Mahaffey et al. | |
| 2013/0061222 A1* | 3/2013 | Hwang et al. | G06F 21/561 |
| 2013/0067577 A1* | 3/2013 | Turbin | G06F 21/562 726/24 |

FOREIGN PATENT DOCUMENTS

| | | |
|---|---|---|
| CN | 1936910 A | 3/2007 |
| CN | 102254113 A | 11/2011 |
| CN | 102346829 A | 2/2012 |
| CN | 102663286 A | 9/2012 |

OTHER PUBLICATIONS

Castillo, Android Malware Past, Present, and Future, Mobile Security Working Group, Copyright .COPYRGT. 2011, McAfee, Inc.

International Search Report regarding Chinese International Application No. PCT/CN2013/072474 dated May 7, 2013, 4 pages.

English translation of abstract only of Chinese application CN1567118A, Publication date: Jan. 19, 2005, Country: CN, Inventors: Li Tao, et al., one page.

English translation of abstract only of Chinese application CN1441351A, Publication date: Sep. 10, 2003, Country: CN, Inventors: Aki Morota, et al., one page.

English translation of abstract only of Chinese application CN101162485A, Publication date: Apr. 16, 2008, Country: CN, Inventors: Zhi Wang, et al., one page.

English translation of abstract only of Chinese application CN102663285A, Publication date: Sep. 12, 2012, Country: CN, Inventors: Xun Wang, et al., one page.

\* cited by examiner

METHOD AND DEVICE FOR IDENTIFYING VIRUS APK

CROSS-REFERENCE TO RELATED APPLICATIONS

The present disclosure is a Continuation Application of U.S. patent application Ser. No. 14/386,681, filed Sep. 19, 2014, which is a 371 U.S. National Stage Application of Patent Application No. PCT/CN2013/072474, filed on Mar. 12, 2013, which claims priority to Chinese Patent Application No. 201210076889.2, filed on Mar. 21, 2012, the entire contents of which are hereby incorporated by reference.

FIELD OF THE INVENTION

The present invention relates to the technical field of network information security, and particularly to a method for identifying virus APK and a device for identifying virus APK.

BACKGROUND OF THE INVENTION

Android is an open source code operating system based on Linux and mainly used for mobile terminals such as mobile phones, and does not have a uniform Chinese equivalent term to date. An Android platform consists of an operating system, middleware, a user interface and application software.

APK is an abbreviation of Android application package file, namely, Android installation package, and it may also be understood as application software installed on the Android terminal. APK is in a file format similar to Symbian Sis or Sisx. The APK file may be installed by being directly delivered to an Android simulator or Android terminal and executed. Like sis, the apk file packages an android sdk compiling project into an installation program file in an apk format. The APK file is in fact in a zip format with an extension name being modified to apk, and it is decompressed by Unzip to get a Dex file. Dex represents Dalvik VM executes, namely, an Android Dalvik execution program, not a standard Java byte code but a Dalvik byte code. Upon running a program, Android first needs to decompress by using UnZip and then directly run it like Symbian, different from a PE file in Windows Mobile.

Specifically, the structure of the APK file is shown in the following table:

| | |
|---|---|
| META-INF\ | Store files CERT.RSA, CERT.SF, and MANIFEST.MF |
| res\ | Store APK-related source files |
| AndroidManifest.xml | APK global configuration file |
| classes.dex | Dalvik Executable (Dalvik virtual machine executable file) |
| resources.arsc | Binary resource file after compilation |

Upon specific application, APK may be imported into a mobile terminal via a data line or via wireless data transmission, or directly downloaded and installed through a market (tool software such as Android market) or webpages. As Android terminals get popularized and developed, various APK come into being and include virus APK, for example, some APK do harm to a user's rights and interests by malicious behaviors such as short message customization payment service, dialing charged telephone or backing up sensitive data in the user's mobile phone to a specific server.

Currently, there already occur some mobile terminal-specific security software (e.g., mobile phone antivirus software) for checking and killing these viruses APK. Methods for checking and killing the virus APK by these current security software mainly include the following two kinds:

The first kind is identifying the virus APK by means of HASH, signature, package name of the APK file on the principle of extracting a KEY for APK by using HASH algorithm, and then identifying virus APK according to the KEY, or identifying it through the virus APK maker's APK digital signature and package name.

However, the above current manner of identifying based on HASH of the APK file probably, by re-confusing or adding a new source file to the APK file or even modifying the code, causes the KEY extracted through HASH algorithm to change and thereby causes failure to identify; the above current signature-based identifying manner may be evaded by changing the signature; the above current package name-based identifying manner may be evaded by changing the package name. Furthermore, it is very easy for virus maker to change the confusion manner, modify APK file (adding or deleting resource, code or the like) or change the signature. Hence, the virus maker can very easily make a new virus variation and thereby evade the identification of the security software.

The second kind is identifying the virus APK through a class name in classes.dex in the APK file on the principle of identifying by analyzing classes in the classes.dex and then extracting names of several classes as virus characteristic codes, and then parsing the classes.dex file in the virus APK to see whether it contains specific class names.

However, this identifying manner by scanning class names might cause mis-reporting as only checking class names on the one hand, and on the other hand, it is very easily evaded by the virus maker by confusing or directly modifying the class name.

Hence, a technical problem to be solved by those skilled in the art currently is to provide a virus APK identifying mechanism to rapidly, accurately and effectively identify the virus APK and a variation thereof, thereby improving the security of an APK application.

SUMMARY OF THE INVENTION

In view of the above problems, the present invention is proposed to provide a method and device for identifying virus APK, which can overcome the above problems or at least partially solve or ease the above problems.

According to an aspect of the present invention, there is provided a method for identifying virus APK, comprising: presetting a virus database comprising virus characteristic codes; detecting that a designated file in a target Android installation package APK contains at least one of the virus characteristic codes; and determining that the target Android installation package APK is a virus APK.

According to another aspect of the present invention, there is provided a device for identifying virus APK, comprising: a processor; and a memory communicatively coupled to the processor and storing instructions upon execution by the processor cause the device to: preset a virus database comprising a virus characteristic codes; detect whether a designated file in a target Android installation package APK contains the virus characteristic codes; determine that the target Android installation package APK is a virus APK when the designated file in the target Android installation package APK contains at least one of the virus characteristic code.

According to a further aspect of the present invention, there is provided a non-transitory computer readable medium which stores the computer program comprising computer readable code, and running of said computer readable code on a computing device causes said device to carry out a method for identifying virus APK, said method comprising: presetting a virus database comprising virus characteristic codes; detecting that a designated file in a target Android installation package APK contains at least one of the virus characteristic codes; and determining that the target Android installation package APK is a virus APK.

Advantageous effects of the present invention are as follows: in the present invention, a designated file such as an executable file or a text file in a source APK file is scanned and analyzed, corresponding virus characteristic codes are generated with respect to instructions, constants or header information containing virus information according to predetermined rules; then during virus APK identification, the designated file in a target APK file is detected, judgment is made as to whether the designated file contains virus characteristic codes in the virus database, and thereby determining whether the target APK is virus APK. When the embodiments of the present invention are applied, no matter how the virus maker makes virus variants by modifying confusion manner, increasing resources, modifying codes (changing class name, function name and the like), replacing signature or package name, the characteristic codes of the virus APK do not change so that the present invention may quickly, accurately and effectively identify the virus APK and variants thereof. Furthermore, it is troublesome and time-consuming for the virus maker to make virus variants by purposefully changing program logic and specific character string (malicious code and malicious web address). Hence, this manner can also efficiently increase difficulty for the virus maker in making virus variants and improve security of APK application.

The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments and not construed as limiting the present invention. In all figures, the same reference number denotes the same part. In the figures.

DETAILED DESCRIPTION OF THE INVENTION

The present invention will be further described below with reference to figures and specific embodiments.

One of core ideas of embodiments of the present application is as follows: scanning and analyzing a designated file such as an executable file or a text file in a source APK file, generating corresponding virus characteristic codes with respect to instructions, constants or header information containing virus information according to predetermined rules, and compiling the virus characteristic codes into a virus database; then, during virus APK identification, detecting the designated file in a target APK file, judging whether the designated file contains virus characteristic codes in the virus database, and thereby determining whether the target APK is virus APK.

Figure 1:
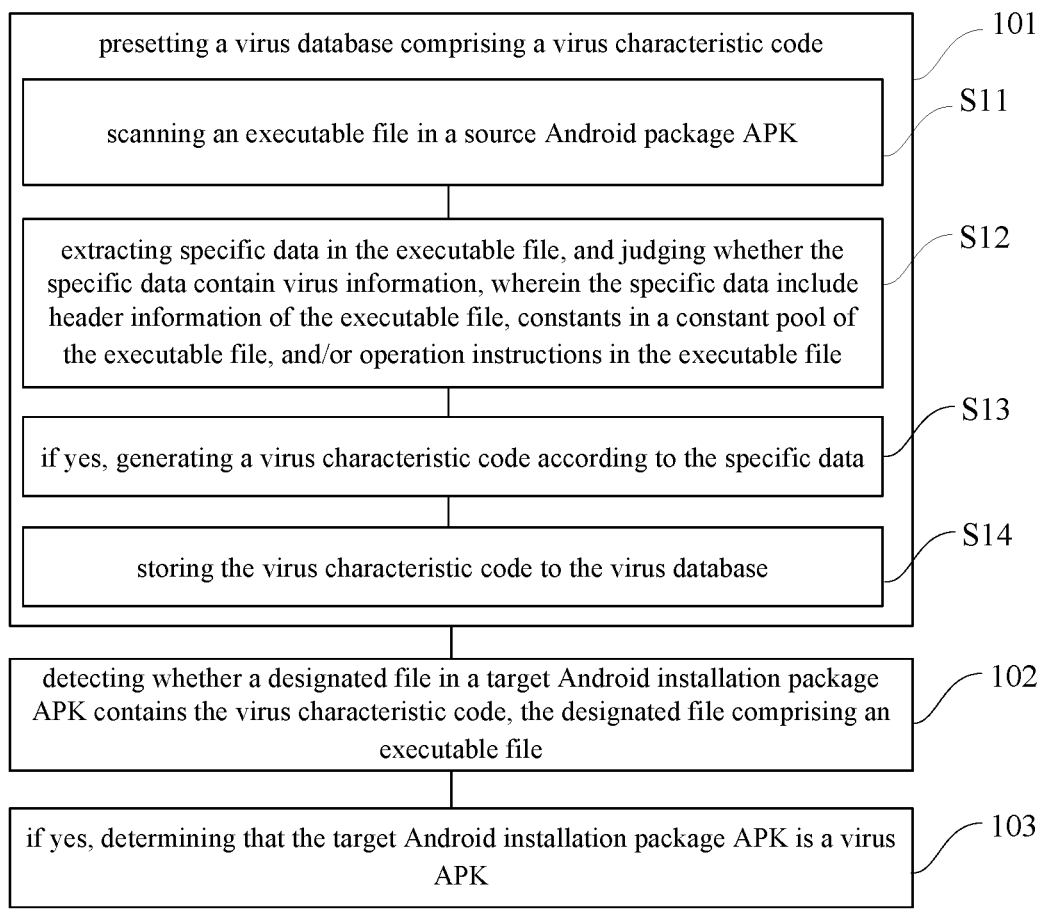
FIG. 1 illustrates a flow chart of a method for identifying virus APK according to Embodiment 1 of the present invention.

Referring to FIG. 1, it illustrates a flow chart of a method for identifying virus APK according to Embodiment 1 of the present invention. It may specifically comprise the following steps:

Step 101: presetting a virus database including virus characteristic codes;

In a preferred embodiment of the present invention, the designated file comprises an executable file. The virus database may be preset by the following substeps:

Substep S11: scanning an executable file in a source Android package APK;

Substep S12: extracting specific data in the executable file, and judging whether the specific data contain virus information, wherein the specific data include header information of the executable file, constants in a constant pool of the executable file, and/or operation instructions in the executable file;

Substep S13: if yes, generating a virus characteristic code according to the specific data;

Substep S14: storing the virus characteristic code to the virus database.

Regarding APK, the executable file may comprise a Dex file which is mainly classes.dex file, namely, Dalvik Executable (Dalvik virtual machine executable file) in APK. As well known, Dalvik is a Java virtual machine for use in an Android platform. The Dalvik virtual machine (Dalvik VM) is one of kernel integral parts of an Android mobile apparatus platform. It may support the running of Java application program already converted into .dex (namely Dalvik Executable) format. The .dex format is a compression format purposefully designed for Dalvik and is adapted for a system with limited memory and processor speed. After optimization, Dalvik permits an example of simultaneously running a plurality of virtual machines in the limited memory, and each Dalvik application is executed as an independent Linux process. The independent process may prevent all programs from being closed when the virtual machines fail.

More preferably, the executable file may include a file with an extension name .jar. The JAR file in the Android installation package is in fact a Dex file, and the only thing is that its extension name is .jar. Regarding other files in the APK other than classes.dex, whether to scan may be decided so long as it is judged as Dex file.

In practical application, the Dex file may further include other files in Dex format.

In a preferred embodiment of the present invention, the specific data in the executable file may be extracted in the following order:

1) Constants in the Constant Pool in the Executable File

Specifically, the constants in the constant pool in the executable file may include constants in character strings, types, fields and methods. Whether the constants in the constant pool in the executable file contain virus information may be judged by the following substeps:

Substep S21: judging whether constants in the character strings contain malicious information such as pre-defined malicious web address information, malicious file names or malicious number information; and/or, Substep S22: judging whether constants in the types, fields and methods invoke self-defined class names, self-defined function names, Android system SDK class names, and Android system function names.

Upon specific application, the virus information in the constants may be regarded as virus characteristic codes. The virus characteristic codes generated in the embodiment include constant characteristic codes, and class name function name characteristic codes.

For example, the constant pool in the classes.dex file of a certain APK includes the following character string:

com.noshufou.android.su

/system/app/com.google.update.apk

After it is judged as virus information, it may be directly stored to the virus database as a virus characteristic code.

For example, the constant pool in the classes.dex file of a certain APK includes the following method:

Lcom/android/main/SmsReceiver;

Lcom/android/main/ActionReceiver;

After it is judged as virus information, it may be directly stored to the virus database as a virus characteristic code.

For example, the constant pool in the classes.dex file of a certain APK includes the following type:

Lcom/androidkernel/flash/Main$1;

After it is judged as virus information, it may be directly stored to the virus database as a virus characteristic code.

For example, the constant pool in the classes.dex file of a certain APK includes the following field:

Lcom/androidkernel/flash/b/br$1;.this$0:Lcom/android-kernel/flash/b/br;

After it is judged as virus information, it may be directly stored to the virus database as a virus characteristic code.

2) Operation Instructions in the Executable File;

Dalvik VM is designed based on a register. Data such as strings, types, fields and methods used in the program are stored in a dedicated data storage area (constant pool), and they are cited by corresponding index in the program. The character literal constant is directly stored in instructions (operation instructions) and its operating codes (opcode) are classified into two types:

One type is placing designated data in the register, e.g., as shown in Example 1 through Example 4 below:

Example 1

1303 6100 |0000: const/16 v3, #int 97 // #61 wherein an integer 97 is placed in a register v3.

Example 2

1700 0000 0040 |0049: const-wide/32 v0, #float 2.000000 // #40000000

Wherein a floating point number 2.000000 is placed in a register v0.

Example 3

1a00 7d00 |000b: const-string v0, "%.2fMB" // string@007d

Wherein a string "%.2fMB" is placed in the register v0.

Example 4

1c03 6e04 |0015: const-class v3, Lcom/qihoo360/mobile-safe/service/NetTrafficService; // type@046e Wherein a class, com.qihoo360.mobilesafe.service.NetTrafficService, is placed in the register v3.

The other type is performing operation based on the register, e.g., as shown in the following Example 5 through Example 10:

Example 5

3100 0305 |0042: cmp-long v0, v3, v5

Wherein long values in the registers v3 and v5 are compared and a comparison result is stored in the register v0.

Example 6

3221 0400 |001a: if-eq v1, v2, 001e // +0004 if shows a condition that, execution of the flow is decided according to whether v1 is equal to v2.

Example 7

3800 1500 |001e: if-eqz v0, 0033 // +0015 if shows a condition that, execution of the flow is decided by judging whether v0 is equal to 0.

Example 8

6e10 0e29 0500 |0006: invoke-virtual {v5}, Ljava/io/File;.length:( )J // method@290e Wherein length( ) function of File is invoked.

Example 9

7010 042a 0800 |011d: invoke-direct {v8}, Ljava/lang/StringBuilder;.<init>:( )V // method@2a04

Wherein init function in StringBuilder is invoked.

Example 10 b021 |0035: add-int/2addr v1, v2 wherein the result of v1+v2 is stored in v1.

User class name, function name and string in the class-es.dex file and JAR file in the APK vary with confusion or modification, but instructions of Dalvik VM and invocation of the class provide by Android system SDK are not affected by confusion or modification of the user class name, function name and variable name. Accordingly, the APK may be identified through a group of sequential specific instructions. Dalvik VM is based on the register, its instructions per se can only operate the register, character literal constant and data storage area, while an address of the register is invariable, hence, fuzzy matching is required upon identification, namely, through a fixed portion, namely, by identifying fixed portions in the instructions—opcode and its related character literal constant parameters or strings, types, fields and methods in the data storage area. Certainly, the instructions and its operands themselves may be directly regarded as the virus characteristic codes.

In a preferred embodiment of the present invention, whether the operation instructions contain the virus information may be judged by the following substeps:

Substep S31: judging whether the operands includes pre-defined illegal operands;

and/or substep S32: judging whether the combination of the opcodes and operands comply with predetermined illegal matching rules.

In a preferred embodiment of the present invention, the virus characteristic code may be generated according to the operation instruction by the following substeps:

Substep S41: regarding the operation instruction itself as the virus characteristic code; and/or Substep S42: regarding the opcode of the operation instruction and a character string or wildcard of the operand as the virus characteristic code.

The virus characteristic codes generated by applying the embodiment comprise an operand characteristic code, an instruction characteristic code and an instruction characteristic code sequence.

The first solution of generating the characteristic code:

An instruction set itself in the classes.dex file and JAR file in the APK is directly used as the virus characteristic codes.

For example, the characteristic code of the above Example 1 may be 1303 6100, the characteristic code of Example 2 may be 1700 0000 0040, the characteristic code of Example 3 may be 1a00 7d00, the characteristic code of Example 4 may be 1c03 6e04, the characteristic code of Example 5 may be 3100 0305, the characteristic code of Example 6 may be 3221 0400, the characteristic code of Example 7 may be 3800 1500, the characteristic code of Example 8 may be 6e10 0e29 0500, the characteristic code of Example 9 may be 7010 042a 0800, and the characteristic code of Example 10 may be b021.

The second solution of generating the characteristic code:

A specific opcode in the classes.dex file and JAR file in the APK and a character string or wildcard of its operand are used as the virus characteristic code.

For example, the characteristic code in the above Example 1 may be 135$* (wherein * represents fuzzy matching, the same hereunder; noticeably "*" here is only used for exemplary purpose and any character may be used in practice), the characteristic code in Example 2 may be 17$*, the characteristic code of Example 3 may be 1 a$, the characteristic code of Example 4 may be 1c$ Lcom/qihoo360/mobilesafe/service/NetTrafficService, the characteristic code of Example 5 may be 31$*, the characteristic code of Example 6 may be 32$*, the characteristic code of Example 7 may be 38$*, the characteristic code of Example 8 may be 6e$Ljava/io/File;.length:( ), the characteristic code of Example 9 may be 70$Ljava/lang/StringBuilder;.<init>, and the characteristic code of Example 10 may be b0$*.

The third solution of generating the characteristic code:

The above solution 1 and solution 2 are used in mixture, that is, an instruction set itself in the classes.dex file in the APK, and a specific opcode in the classes.dex file in the APK and a character string or wildcard of its operand are all used as the virus characteristic codes.

Noticeably, "$" is used as a separating character in the embodiment of the present invention. Any other character may be used as the separating character in practice. "*" is used as wildcard in the embodiment of the present invention, but any other character may be used as the wildcard in practice.

The following specific examples are presented to help those skilled in the art to better understand the above characteristic code generating procedure:

Regarding extracting the constant pool (string, type, field and method) in the classes.dex, the characteristic code extracted from the constants therefrom is as follows: for example, the character string constant pool of a certain virus includes the following feature character string:

zjphonecall.txt and zjsms.txt. The two files include a malicious telephone number and a special service short message number, and they may be extracted as the virus characteristic codes.

The characteristic code extracted for disassembling classes.dex is as follows:

For example, a virus X-undercover.apk contains the following instructions to back up the user's private data to http://www.mybackup.me, as listed below according to the sequential order of occurrence thereof:

2200 f600 |0000: new-instance v0, Ljava/lang/StringBuilder; // type@00f6

Its virus characteristic code is extracted as:

2200f600 or 22$Ljava/lang/StringBuilder 7010 9804 0000 |0002: invoke-direct {v0}, Ljava/lang/StringBuilder;.<init>:( )V // method@0498

Its virus characteristic code is extracted as:

70109804000 or 70$Ljava/lang/StringBuilder;.<init>

1a01 5506 |0005: const-string v1, "http: //www.mybackup.me" // string@0655

Its virus characteristic code is extracted as:

701098040000 or 1a$http://www.mybackup.me

6e20 9e04 1000 |0007: invoke-virtual {v0, v1}, Ljava/lang/StringBuilder;.append:(Ljava/lang/String;)Ljava/lang/StringBuilder; // method@049e Its virus characteristic code is extracted as:

6e209e041000 or 6e$Ljava/lang/StringBuilder;.append 3902 0900 |0005: if-nez v2, 000e// +0009

Its virus characteristic code is extracted as:

39020900 or 39$*

0c02 |0003: move-result-object v2

Its virus characteristic code is extracted as:

0c02 or 0c$*

The finally obtained characteristic code is:

The first solution for selecting the characteristic code:

2200f6007010980400007010980400006e209e0410-00390209000c02

The second solution for selecting the characteristic code:

22$Ljava/lang/StringBuilder$70$Ljava/lang/StringBuilder;.<init>$1a$ http://www.mybackup.me$6e$Ljava/lang/StringBuilder;.append$39$*$0c$*

The third solution for selecting the characteristic code:

22$Ljava/lang/StringBuilder$701098040000$1a$http://www.mybackup.me$6e$Ljava/lang/StringBuilder;.append$39$*$0c02

Again for example, instructions (operation instructions) in the classes.dex file of a certain APK are listed as follows:

1a0c bb08 |009b: const-string v12, "tiger" // string@08bb

1a0d 1e03 |009d: const-string v13, "P5" // string@031e 7120 1404 dc00 |009f: invoke-static {v12, v13}, Lcom/androidkernel/flash/util/LogUtil;.i:(Ljava/lang/String; Ljava/lang/String;)V // method@0414

2205 9700 |00a2: new-instance v5, Lcom/androidkernel/flash/http/base/DlStruct; // type@0097

7010 1603 0500 |00a4: invoke-direct {v5}, Lcom/androidkernel/flash/http/base/DlStruct;.<init>:( )V // method@0316

1a0c 7200 |00a7: const-string v12, "AA" // string@0072
7020 f402 ce00 |00a9: invoke-direct {v14, v12}, Lcom/androidkernel/flash/helper/Tiger;.getUrl:(Ljava/lang/String;)Ljava/lang/String; // method@02f4
0c0b |00ac: move-result-object v11

When judging the combination of the above opcode and operand complies with pre-defined illegal combination rules, or upon judging the above operand includes a pre-defined illegal operand, the following manners are employed to generate the characteristic code:

Manner 1:
1a0cbb081a0d1e0371201404dc00220597007010160-305001a0c720070 20f402ce000c0b Manner 2:
1a$tiger$1a$P5$71$Lcom/androidkernel/flash/util/LogUtil;.i:(Ljava/lang/String;Ljava/lang/String;)V$22$Lcom/androidkernel/flash/http/base/DlStruct;$70$Lcom/androidkernel/flash/http/base/DlStruct;.<init>:( )V$1a$ AA$70$Lcom/androidkernel/flash/helper/Tiger;.getUrl:(Ljava/lang/String;)Ljava/lang/String;$0c$*

Manner 3:
1a0cbb08$1a$P5$71201404dc00$22$*$70$Lcom/androidkernel/flash/http/base/DlStruct;<init>:
(    )V$1a$AA$70$Lcom/androidkernel/flash/helper/Tiger;.getUrl:(Ljava/lang/String;)Ljava/lang/String;$0c$*

3) Header Information of the Executable File

In specific implementation, the header information of the executable file includes summary information checksum and/or signature information Signature. In this case, whether the header information includes virus information may be determined by judging whether the summary information checksum and/or signature information Signature include pre-defined illegal character strings.

In specific application, the summary information checksum and/or signature information Signature may be directly regarded as the virus characteristic code. That is to say, in the present embodiment, the virus characteristic code includes a header information characteristic code.

For example, the checksum of the header information header of the classes.dex file in the APK is: 11f26cac; and the Signature is 2911621AD071F675ADF0F590C3F1AFB5443BEBBE. When they are judged as Trojan virus, 11f26cac and 2911621AD071F675ADF0F590C3F1AFB5443BEBBE are directly extracted as virus characteristic codes, and the virus characteristic codes are stored in the database.

As an example of specific application of the embodiment of the present invention, the step of storing the virus characteristic codes to the virus database may comprise the following substeps:

Substep S51: storing the header information characteristic code, constant characteristic code, operand characteristic code, instruction characteristic code, instruction characteristic code sequence, class name function name characteristic code respectively in different storage areas of the database; or Substep S52: storing the header information characteristic code, constant characteristic code, operand characteristic code, instruction characteristic code, instruction characteristic code sequence, class name function name characteristic code in the database, and marking a classification tag respectively.

Certainly, the above manners for storing the virus characteristic codes are only exemplary. It is feasible for those skilled in the art to employ any storing manner according to actual situations. The present invention does not limit in this regard.

Step 102: detecting whether a designated file in a target Android installation package APK contains the virus characteristic code, the designated file including an executable file;

As an example of specific application of the embodiment of the present invention, the virus characteristic code may comprise: header information characteristic code, constant characteristic code, operand characteristic code, instruction characteristic code, instruction characteristic code sequence, and class name function name characteristic code; in this case, step 102 may specifically comprise the following substeps:

Substep S41: positioning the header information of the executable file in the target Android installation package APK, matching the head information with the header information characteristic code in the virus database, and judging the designated file in the target Android installation package APK includes the virus characteristic code if they are matched; and/or Substep S42: positioning a constant in the constant pool of the executable file in the target Android installation package APK, matching the constant with the constant characteristic code in the virus database, and judging the designated file in the target Android installation package APK includes the virus characteristic code if they are matched; and/or Substep S43: positioning an operand in the operation instruction of the executable file in the target Android installation package APK, matching the operand with the operand characteristic code in the virus database, and judging the designated file in the target Android installation package APK includes the virus characteristic code if they are matched; and/or Substep S44: positioning an opcode in the operation instruction of the executable file in the target Android installation package APK, matching the opcode with the instruction characteristic code in the virus database, and judging the designated file in the target Android installation package APK includes the virus characteristic code if they are matched; and/or Substep S45: positioning an opcode in the operation instruction of the executable file in the target Android installation package APK, matching the opcode with the instruction characteristic code sequence in the virus database, and judging the designated file in the target Android installation package APK includes the virus characteristic code if they are matched; and/or Substep S46: positioning class name and/or function name invoked by the constant in the constant pool in the executable file and the operand in the operation instruction in the target Android installation package APK, matching the class name and/or function name with the class name function name characteristic code in the virus database, and judging the designated file in the target Android installation package APK includes the virus characteristic code if they are matched.

In specific implementation, matching may be performed in the following manners:

Manner 1: directly scanning every byte in sequence.

Manner 2: scanning the virus characteristic code sequence in sequence, which only requires the virus characteristic code instructions to occur in sequence, not to occur continuously.

Manner 3: only all or partial characteristic code instructions are required to exist.

Certainly, the above detecting and matching manners are only exemplary. It is feasible for those skilled in the art to employ any virus characteristic code detecting and matching manner according to actual situations. The present invention does not limit this.

Step 103: if yes, determining that the target Android installation package APK is a virus APK.

The following specific examples are presented to help those skilled in the art to better understand the present invention.

Example 1

1) Positioning to a location where the operation instruction of classes.dex or JAR in the APK begins (hereinafter referred to as code segment);

2) extracting a first instruction from the virus characteristic code sequence in the virus database according to a separating character;

3) extracting a first instruction from the code segment;

4) comparing the two, and extracting next instruction from a characteristic code sequence according to the separating character if they are the same, and extracting next instruction from the code segment if they are different;

5) performing matching instruction by instruction in such similar manner until reaching the ending of the code segment, and reporting the finding of the virus in the case of complete matching during the matching.

Example 2

1) extracting a corresponding characteristic character string (which may be one or more) from the virus characteristic codes of the virus database;

2) searching whether the corresponding characteristic character string exists in a character string constant pool;

3) reporting the finding of the virus APK in the event of existence.

Example 3

1) extracting a corresponding characteristic character string (which may be one or more) and characteristic function name (which may be one or more) from the virus characteristic codes;

2) searching whether the corresponding characteristic character string and characteristic function name exist in a character string constant pool and a function constant pool; scanning other combinations of string, type, field and method pool in such similar way;

3) reporting the finding of the virus APK in the event of existence.

Those skilled in the art can easily understand that the above operation instruction, constant pool and header information are not limited in the scanning sequence. It is feasible for those skilled in the art to arbitrarily set the scanning sequence of the above three according to actual situations. The present invention does not limit this here.

The embodiment of the present invention is further adapted for the situation that an APK is embedded in another APK, i.e., an APK includes other APKs. Parsing and virus extraction are performed for executable files and text files in the APK and the embedded APK, for example, the embodiment of the present invention applies to a situation that a root.apk is embedded in a certain 1.APK to obtain a root right, and in this case, the virus characteristic code is extracted from 1.APK as well as from the root.apk. Those skilled in the art can readily envisage that the embodiment of the present invention also apply to a situation that APKs are embedded for many times. The present invention does not limit this here.

Figure 2:
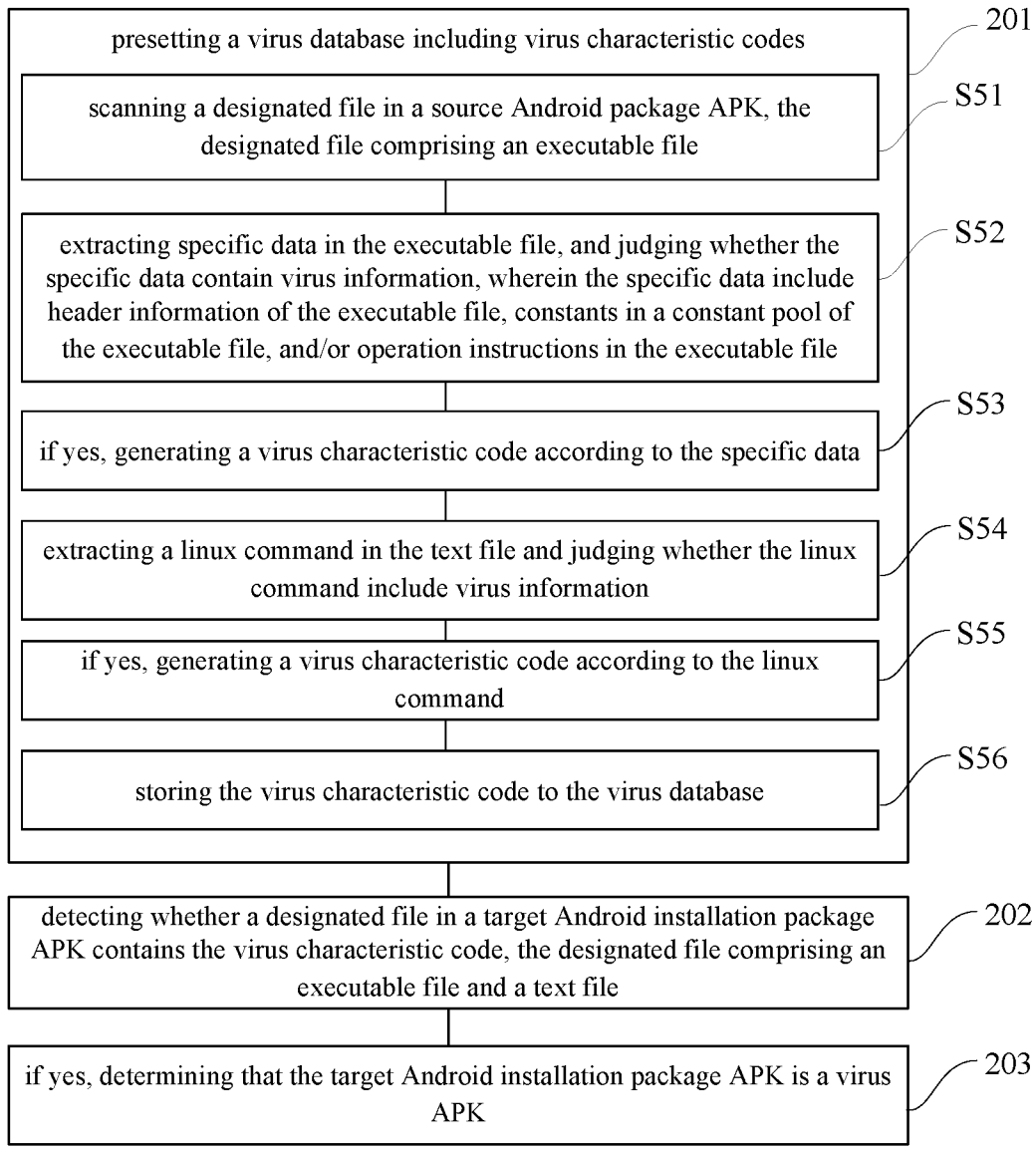
FIG. 2 illustrates a flow chart of a method for identifying virus APK according to Embodiment 2 of the present invention.

Referring to FIG. 2, it illustrates a flow chart of a method for identifying virus APK according to Embodiment 2 of the present invention, comprising the following steps:

Step 201: presetting a virus database including virus characteristic codes;

In a preferred embodiment of the present invention, the step 201 may comprises the following substeps:

Substep S51: scanning a designated file in a source Android package APK, the designated file comprising an executable file and/or a text file;

Substep S52: extracting specific data in the executable file, and judging whether the specific data contain virus information, wherein the specific data include header information of the executable file, constants in a constant pool of the executable file, and/or operation instructions in the executable file;

Substep S53: if yes, generating a virus characteristic code according to the specific data;

Substep S54: extracting a Linux command in the text file and judging whether the Linux command include virus information;

Substep S55: if yes, generating a virus characteristic code according to the Linux command;

Substep S56: storing the virus characteristic code to the virus database.

In specific implementation, whether the Linux command includes virus information by judging whether Linux command complies with a preset malicious Linux command, and the Linux command including the virus information may be directly regarded as the virus characteristic code. In the present embodiment, the virus characteristic code further comprises Linux command characteristic code.

For example, a corresponding Linux command is extracted from the text file in the APK as follows:

cat/system/bin/sh>/data/data/$1/files/sh.new
chown 0.0/data/data/$1/files/sh.new
chmod 4755/data/data/$1/files/sh.new
rm -f/data/data/$1/files/sh
mount -o remount system/system
mkdir/system/xbin/$1
myuid=$2
if ["$myuid"==""]; then
myuid="0"
fi
chown ${myuid} /system/xbin/$1
chmod 700 /system/xbin/$1
cat/system/bin/sh>/system/xbin/$1/sh
chown 0.0 /system/xbin/$1/sh
chmod 4755 /system/xbin/$1/sh
sync
mount -o remount,ro system/system
/system/bin/stop void
/system/bin/start void
echo "+++ending+++"

when judging the Linux command complies with a preset malicious Linux command, the above command is written into the virus database as the virus characteristic code.

Step 202: detecting whether a designated file in a target Android installation package APK contains the virus characteristic code, the designated file including an executable file and a text file;

In a preferred embodiment of the present invention, step 202 may comprise the following substep:

positioning the text file in the target Android installation package APK, matching the Linux command in the text file with the Linux command characteristic code in the virus database, and judging the designated file in the target Android installation package APK includes the virus characteristic code if they are matched.

Step 203: if yes, determining that the target Android installation package APK is a virus APK.

The embodiment of the present invention applies to client software and Cloud checking and killing, i.e., the above procedure of identifying the virus APK may be implemented either at the client, or at a server or a cloud. The present invention does not limit this here.

Application scenarios of the embodiment of the present invention are presented as follows:

Scenario 1: according to the user's virus scanning start operation, first checking whether the APK is altered and whether a scanning result is buffered; if the APK is not altered and the scanning result is buffered, the scanning result is outputted directly, and blacklist scanning is performed on the contrary; if APK is found therein, outputting the scanning result that the virus APK is found and adding to the buffer; if not found, whitelist scanning is performed; if the APK is found therein, outputting the scanning result regarding security and adding to the buffer; if not found, the virus database is used to perform scanning of the virus characteristic code, and the scanning result is outputted an added to the buffer.

Scenario 2: when the user newly installs the APK, an antivirus program receives a message about new installation of APK and begins to scan the APK newly installed by the user. First it performs blacklist scanning, if APK is found therein, outputting the scanning result that the virus is found and adding to the buffer; if not found, whitelist scanning is performed; if the APK is found therein, outputting the scanning result regarding security and adding to the buffer; if not found, the virus database is used to perform scanning of the virus characteristic code, and the scanning result is outputted an added to the buffer.

Those skilled in the art can easily understand that whether the current APK is the virus APK may be judged by directly detecting whether the text file includes the virus characteristic code. To save space, the solution is not detailed in the description of the present invention.

In the present invention, a designated file such as an executable file or a text file in a source APK file is scanned and analyzed, corresponding virus characteristic codes are generated with respect to instructions, constants or header information containing virus information according to predetermined rules; then during virus APK identification, the designated file in a target APK file is detected, judgment is made as to whether the designated file contains virus characteristic codes in the virus database, and thereby determining whether the target APK is virus APK. When the embodiments of the present invention are applied, no matter how the virus maker makes virus variants by modifying confusion manner, increasing resources, modifying codes (changing class name, function name and the like), replacing signature or package name, the characteristic codes of the virus APK do not change so that the present invention may quickly, accurately and effectively identify the virus APK and variants thereof. Furthermore, it is troublesome and time-consuming for the virus maker to make virus variants by purposefully changing program logic and specific character string (malicious code and malicious web address).

Hence, this manner can also efficiently increase difficulty for the virus maker in making virus variants and improve security of APK application.

Noticeably, embodiments of the present invention is not only adapted for various Android terminals, namely, terminals using Android platform (operating system), including computers, PC, notebook computer, mobile phone, flat panel computer and the like, but also adapted for virus characteristic code extracting solutions used on other computer systems (such as Windows or Linux).

Regarding the method embodiments, for sake of simple depiction, they are described as a series of combinations of actions. However, those skilled in the art should appreciate that the present invention is not limited to the order of the described actions because according to the present invention, some steps may be performed in other order or simultaneously. Secondly, those skilled in the art should appreciate that embodiments described in the description all belong to preferred embodiments and the involved actions and modules are not certainly requisite in the present invention.

Figure 3:
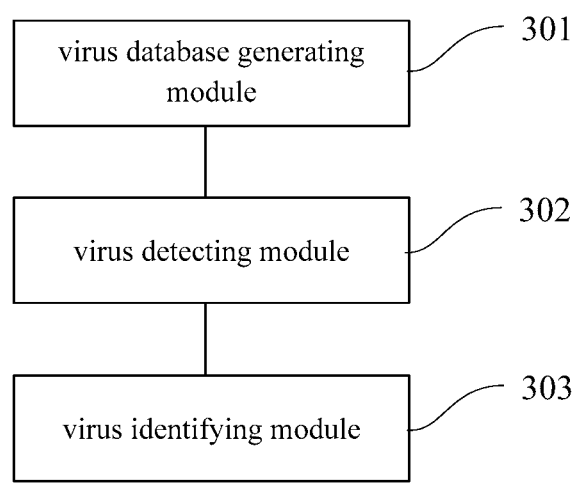
FIG. 3 illustrates a block diagram of a device for identifying virus APK according to an embodiment of the present invention.

Referring to FIG. 3, it illustrates a block diagram of a device for identifying virus APK according to an embodiment of the present invention, which may specifically comprise the following modules:

a virus database generating module 301 configured to preset a virus database comprising a virus characteristic code;

a virus detecting module 302 configured to detect whether a designated file in a target Android installation package APK contains the virus characteristic code;

a virus identifying module 303 configured to determine that the target Android installation package APK is a virus APK when the designated file in the target Android installation package APK contains the virus characteristic code.

In a preferred embodiment of the present invention, the designated file comprises an executable file, and the virus database generating module 301 may include the following submodules:

a source file scanning submodule configured to scan the designated file in a source Android package APK, the designated file comprising an executable file;

a specific data extracting submodule configured to extract specific data in the executable file, and judge whether the specific data contain virus information, wherein the specific data include header information of the executable file, constants in a constant pool of the executable file, and/or operation instructions in the executable file;

a first characteristic code generating submodule configured to generate a virus characteristic code according to the specific data when the specific data contain the virus information;

a characteristic code storing submodule configured to store the virus characteristic code to the virus database.

As an example of specific application of the embodiment of the present invention, the characteristic code storing submodule may further comprise the following units:

an area-specific storing unit configured to store the header information characteristic code, constant characteristic code, operand characteristic code, instruction characteristic code, instruction characteristic code sequence, class name function name characteristic code respectively in different storage areas of the database; or a tag storing unit configured to store the header information characteristic code, constant characteristic code, operand characteristic code, instruction characteristic code, instruction characteristic code sequence, class name function name characteristic code in the database, and mark a classification tag respectively.

In specific application, the executable file may comprise Dex files, the Dex files may comprise classes.dex files, files with an extension name .jar, and files in Dex format.

In a preferred embodiment of the present invention, the virus characteristic code may comprise: header information characteristic code, constant characteristic code, operand characteristic code, instruction characteristic code, instruction characteristic code sequence, and class name function name characteristic code; the operation instructions in the executable file comprise two portions: opcode and operand.

In this case, the virus detecting module 302 may comprise the following submodules:

a first detecting submodule configured to position the header information of the executable file in the target Android installation package APK, match the head information with the header information characteristic code in the virus database, and judge the designated file in the target Android installation package APK includes the virus characteristic code if they are matched; and/or, a second detecting submodule configured to position a constant in the constant pool of the executable file in the target Android installation package APK, match the constant with the constant characteristic code in the virus database, and judge the designated file in the target Android installation package APK includes the virus characteristic code if they are matched; and/or, a third detecting submodule configured to position an operand in the operation instruction of the executable file in the target Android installation package APK, match the operand with the operand characteristic code in the virus database, and judge the designated file in the target Android installation package APK includes the virus characteristic code if they are matched; and/or, a fourth detecting submodule configured to position an opcode in the operation instruction of the executable file in the target Android installation package APK, match the opcode with the instruction characteristic code in the virus database, and judge the designated file in the target Android installation package APK includes the virus characteristic code if they are matched; and/or, a fifth detecting submodule configured to position an opcode in the operation instruction of the executable file in the target Android installation package APK, match the opcode with the instruction characteristic code sequence in the virus database, and judge the designated file in the target Android installation package APK includes the virus characteristic code if they are matched; and/or, a sixth detecting submodule configured to position class name and/or function name invoked by the constant in the constant pool in the executable file and the operand in the operation instruction in the target Android installation package APK, match the class name and/or function name with the class name function name characteristic code in the virus database, and judge the designated file in the target Android installation package APK includes the virus characteristic code if they are matched.

In specific implementation, the header information characteristic code, constant characteristic code, operand characteristic code, and class name function name characteristic code may be directly generated according to the header information, constant, operand, and class name function name including the virus information;

The instruction characteristic code and the instruction characteristic code sequence may be directly generated according to the operation instruction including the virus information, or generated according to the opcode and the character string or wildcard of the operand including the virus information.

In a preferred embodiment of the present invention, the designated file may further comprise a text file, and in this case, the virus database generating module 301 may include the following submodule:

a Linux command extracting submodule configured to extract a Linux command in the text file and judge whether the Linux command includes virus information;

a second characteristic code generating submodule configured to generate a virus characteristic code according to the Linux command when the Linux command includes the virus information.

Correspondingly, the virus characteristic code may further comprise a Linux command characteristic code. The virus detecting module 302 may further comprise the following submodule:

a seventh detecting submodule configured to position the text file in the target Android installation package APK, match the Linux command in the text file with the Linux command characteristic code in the virus database, and judge the designated file in the target Android installation package APK includes the virus characteristic code if they are matched.

In specific application, constants in the constant pool in the executable file may comprise constant in the character strings, types, fields and methods; the header information of the executable file may include summary information checksum and/or signature information Signature.

The embodiment of the system substantially corresponds to the previous method embodiment shown in FIG. 1 and FIG. 2, so it is describer briefly and reference may be made to the corresponding depictions in the above method embodiment.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the device for identifying virus APK according to embodiments of the present invention. The present invention may also be implemented as an apparatus or apparatus program (e.g., computer program and computer program product) for executing part or all methods described here. Such programs implementing the present invention may be stored in a computer-readable medium, or may be in a form having one or more signals. Such signals can be obtained by downloading from the Internet, or provided on a carrier signal or provided in any other forms.

Figure 4:
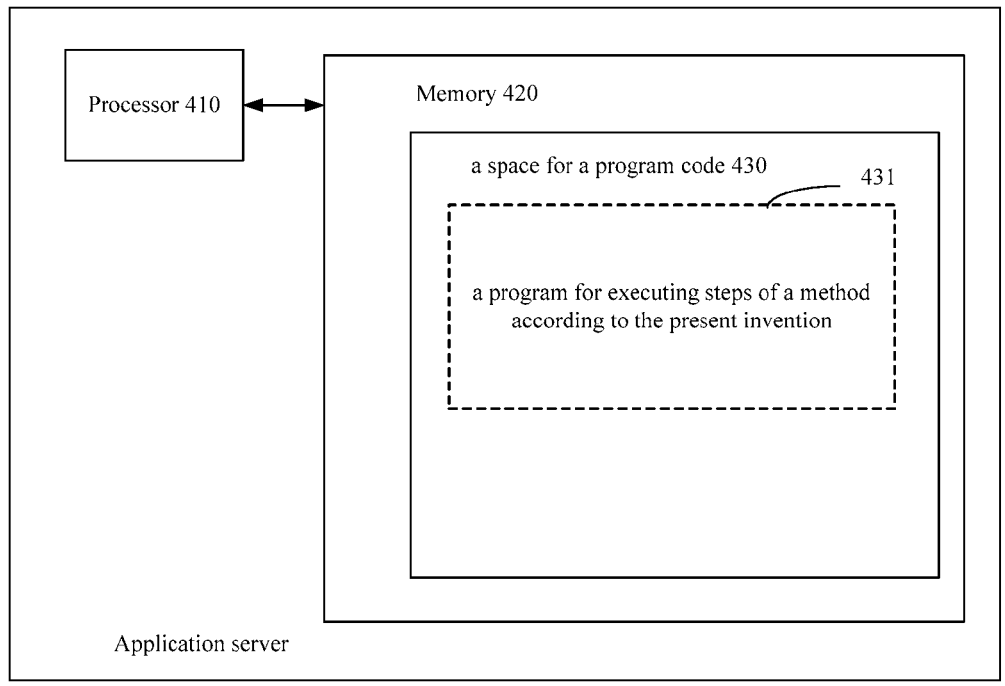
FIG. 4 illustrates a block diagram of a server for executing the method according to the present invention.
Figure 5:
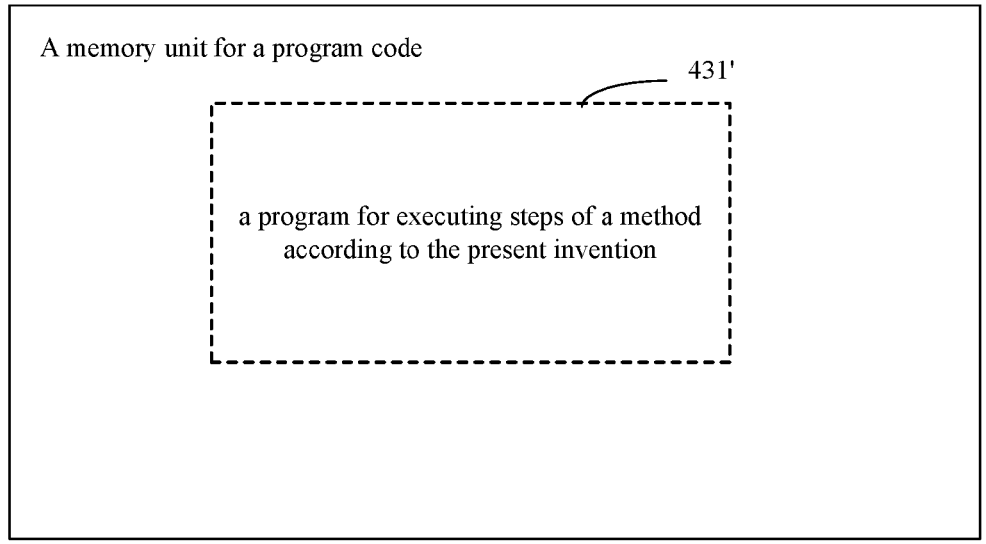
FIG. 5 illustrates a memory unit for maintaining or carrying a program code for implementing the method according to the present invention.

For example, FIG. 4 illustrates a server, for example, an application server, which can implement a method for identifying virus APK according to the present invention. The server conventionally comprises a processor 410 and a computer program product or computer-readable medium in the form of a memory 420. The memory 420 may be a flash memory, EEPROM (Electrically Erasable Programmable Read-Only Memory), EPROM, hard disk or ROM-like electronic memory. The memory 420 has a storage space 430 for a program code 431 for executing any step of the above method. For example, the storage space 430 for the program code may comprise program codes 431 respectively for implementing steps of the above method. These program codes may be read from one or more computer program products or written into one or more computer program products. These computer program products comprise program code carriers such as hard disk, compact disk (CD), memory card or floppy disk. Such computer program products are usually portable or fixed memory units as shown in FIG. 5. The memory unit may have a storage section, a storage space or the like arranged in a similar way to the memory 420 in the server of FIG. 4. The program code may for example be compressed in a suitable form. Usually, the memory unit includes a computer-readable code 431', namely, a code readable by a processor for example similar to 410. When these codes are run by the server, the server is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

The description as provided here describes a lot of specific details. However, it is appreciated that embodiments of the present invention may be implemented in the absence of these specific details. Some embodiments do not specify detail known methods, structures and technologies to make the description apparent.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the device claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

What is claimed is:

1. A method for identifying virus Android application package file (APK), comprising:
    presetting a virus database comprising virus characteristic codes, wherein the presetting the virus database further including:
        scanning an executable file in a source APK,
        extracting specific data from the executable file in the source APK,
        determining whether the specific data contain virus information, wherein the specific data include header information of the executable file, constants in a constant pool of the executable file, or operation instructions in the executable file,
        in response to a determination that the specific data in the executable file contain virus information, generating the virus characteristic codes, wherein the generating the virus characteristic codes further comprises:
            generating the virus characteristic codes using an instruction set in a classes.dex file and a JAR file in the source APK,
            generating the virus characteristic codes using a specific opcode in the classes.dex file and the JAR file in the source APK and a character string or wildcard of its operand, or
            generating the virus characteristic codes using the instruction set in the classes.dex file in the source APK, the specific opcode in the classes.dex file in the source APK and the character string or wildcard of its operand, and
        storing the generated virus characteristic codes to the virus database;
    detecting that a designated file in a target APK contains at least one of the generated virus characteristic codes; and
    determining that the target APK is a virus APK.

2. The method according to claim 1, wherein the executable file comprises Dex files, the Dex files comprise classes.dex files, files with an extension name .jar, and files in Dex format.

3. The method according to claim 1, wherein the virus characteristic codes comprise: header information characteristic code, constant characteristic code, operand characteristic code, instruction characteristic code, instruction characteristic code sequence, and class name function name characteristic code; the operation instructions in the executable file comprise two portions: opcode and operand;
    the header information characteristic code, constant characteristic code, operand characteristic code, and class name function name characteristic code are directly generated according to the header information, constant, operand, and class name function name including the virus information;
    the instruction characteristic code and the instruction characteristic code sequence are directly generated according to the operation instruction including the virus information, or generated according to the opcode and the character string or wildcard of the operand including the virus information;
    the storing the virus characteristic codes to the virus database comprises:
    storing the header information characteristic code, constant characteristic code, operand characteristic code, instruction characteristic code, instruction characteristic code sequence, class name function name characteristic code respectively in different storage areas of the database; or
    storing the header information characteristic code, constant characteristic code, operand characteristic code, instruction characteristic code, instruction characteristic code sequence, class name function name characteristic code in the database, and marking a classification tag respectively.

4. The method according to claim 3, wherein the detecting that a designated file in a target APK contains at least one of the generated virus characteristic codes comprises:
    positioning header information of an executable file in the target APK, matching the head information with the header information characteristic code in the virus database, and judging the designated file in the target APK includes the virus characteristic code if they are matched; and/or positioning a constant in the constant pool of the executable file in the APK, matching the constant with the constant characteristic code in the virus database, and judging the designated file in the target APK includes the virus characteristic code if they are matched; and/or positioning an operand in the operation instruction of the executable file in the target APK, matching the operand with the operand characteristic code in the virus database, and judging the designated file in the target APK includes the virus characteristic code if they are matched; and/or positioning an opcode in the operation instruction of the executable file in the target APK, matching the opcode with the instruction characteristic code in the virus database, and judging the designated file in the target APK includes the virus characteristic code if they are matched; and/or positioning an opcode in the operation instruction of the executable file in the target APK, matching the opcode with the instruction characteristic code sequence in the virus database, and judging the designated file in the target APK includes the virus characteristic code if they are matched; and/or positioning class name and/or function name invoked by the constant in the constant pool in the executable file and the operand in the operation instruction in the target APK, matching the class name and/or function name with the class name function name characteristic code in the virus database, and judging the designated file in the target APK includes the virus characteristic code if they are matched.

5. The method according to claim 1, wherein the designated file comprises a text file, the presetting the virus database comprises: extracting a Linux command in the text file and judging whether the command includes virus information; in response to a determination that the command includes virus information, generating a virus characteristic code according to the command.

6. The method according to claim 5, wherein the virus characteristic codes further comprise a command characteristic code, and the detecting that a designated file in a target APK contains at least one of the virus characteristic codes further comprises: positioning the text file in the target APK, matching the command in the text file with the command characteristic code in the virus database, and judging the designated file in the target APK includes the virus characteristic code if they are matched.

7. The method according to claim 4, wherein constants in the constant pool in the executable file comprise constant in the character strings, types, fields and methods; the header information of the executable file includes summary information checksum and/or signature information.

8. A device for identifying virus Android application package file (APK), comprising:
    a processor; and
    a memory communicatively coupled to the processor and storing instructions upon execution by the processor cause the device to:
    preset a virus database comprising a virus characteristic codes, wherein instructions upon execution by the processor cause the device to preset a virus database further comprises instructions that upon execution by the processor further cause the device to:
    scan an executable file in a source APK;
    extract specific data from the executable file in the source APK;
    determine whether the specific data contain virus information, wherein the specific data include header information of the executable file, constants in a constant pool of the executable file, or operation instructions in the executable file,
    in response to a determination that the specific data in the executable file contain virus information, generate the virus characteristic codes according to the specific data, wherein generating the virus characteristic codes further comprises:
        generating the virus characteristic codes using an instruction set in a classes.dex file and a JAR file in the source APK,
        generating the virus characteristic codes using a specific opcode in the classes.dex file and the JAR file in the source APK and a character string or wildcard of its operand, or
        generating the virus characteristic codes using the instruction set in the classes.dex file in the source APK, the specific opcode in the classes.dex file in the source APK and the character string or wildcard of its operand, and
    store the generated virus characteristic codes to the virus database;
    detect whether a designated file in a target APK contains at least one of the generated virus characteristic codes; and
    determine that the target APK is a virus APK when the designated file in the target APK contains at least one of the virus characteristic code.

9. The device according to claim 8, wherein the executable file comprises Dex files, the Dex files comprise classes.dex files, files with an extension name .jar, and files in Dex format.

10. The device according to claim 9, wherein the virus characteristic codes comprise: header information characteristic code, constant characteristic code, operand characteristic code, instruction characteristic code, instruction characteristic code sequence, and class name function name characteristic code; the operation instructions in the executable file comprise two portions: opcode and operand;
    the header information characteristic code, constant characteristic code, operand characteristic code, and class name function name characteristic code are directly generated according to the header information, constant, operand, and class name function name including the virus information;
    the instruction characteristic code and the instruction characteristic code sequence are directly generated according to the operation instruction including the virus information, or generated according to the opcode and the character string or wildcard of the operand including the virus information;
    the storing the virus characteristic codes to the virus database further comprises:
    storing the header information characteristic code, constant characteristic code, operand characteristic code, instruction characteristic code, instruction characteristic code sequence, class name function name characteristic code respectively in different storage areas of the database; or
    storing the header information characteristic code, constant characteristic code, operand characteristic code, instruction characteristic code, instruction characteristic code sequence, class name function name characteristic code in the database, and mark a classification tag respectively.

11. The device according to claim 10, wherein the memory further storing instructions that upon execution by the processor cause the device to:
- position header information of an executable file in the target APK, match the head information with the header information characteristic code in the virus database, and judge the designated file in the target APK includes the virus characteristic code if they are matched; and/or,
- position a constant in the constant pool of the executable file in the APK, match the constant with the constant characteristic code in the virus database, and judge the designated file in the target APK includes the virus characteristic code if they are matched; and/or,
- position an operand in the operation instruction of the executable file in the target APK, match the operand with the operand characteristic code in the virus database, and judge the designated file in the target APK includes the virus characteristic code if they are matched; and/or,
- position an opcode in the operation instruction of the executable file in the target APK, match the opcode with the instruction characteristic code in the virus database, and judge the designated file in the target APK includes the virus characteristic code if they are matched; and/or,
- position an opcode in the operation instruction of the executable file in the target APK, match the opcode with the instruction characteristic code sequence in the virus database, and judge the designated file in the target APK includes the virus characteristic code if they are matched; and/or,
- position class name and/or function name invoked by the constant in the constant pool in the executable file and the operand in the operation instruction in the target APK, match the class name and/or function name with the class name function name characteristic code in the virus database, and judge the designated file in the target APK includes the virus characteristic code if they are matched.

12. The device according to claim 8, wherein the designated file comprises a text file, and the memory further storing instructions that upon execution by the processor cause the device to: extract a command in the text file and judge whether the command includes virus information; generate a virus characteristic code according to the command when the command includes the virus information.

13. The device according to claim 12, wherein the memory further storing instructions that upon execution by the processor cause the device to: position the text file in the target APK, match the command in the text file with the command characteristic code in the virus database, and judge the designated file in the target APK includes the virus characteristic code if they are matched.

14. The device according to claim 10, wherein constants in the constant pool in the executable file comprise constant in the character strings, types, fields and methods; the header information of the executable file includes summary information checksum and/or signature information.

15. A non-transitory computer readable medium which stores the computer program comprising computer readable code, and running of said computer readable code on a computing device causes said device to carry out a method for identifying virus Android application package file (APK), said method comprising:
- presetting a virus database comprising virus characteristic codes, wherein the presetting the virus database further including:
  - scanning an executable file in a source APK,
  - extracting specific data from the executable file in the source APK,
  - determining whether the specific data contain virus information, wherein the specific data include header information of the executable file, constants in a constant pool of the executable file, or operation instructions in the executable file,
  - in response to a determination that the specific data in the executable file contain virus information, generating the virus characteristic codes, wherein the generating the virus characteristic codes further comprises:
    - generating the virus characteristic codes using an instruction set in a classes.dex file and a JAR file in the source APK,
    - generating the virus characteristic codes using a specific opcode in the classes.dex file and the JAR file in the source APK and a character string or wildcard of its operand, or
    - generating the virus characteristic codes using the instruction set in the classes.dex file in the source APK, the specific opcode in the classes.dex file in the source APK and the character string or wildcard of its operand, and
  - storing the generated virus characteristic codes to the virus database;
- detecting that a designated file in a target APK contains at least one of the virus characteristic codes; and
- determining that the target APK is a virus APK.

\* \* \* \* \*